United States Patent
Khanzada (10) Patent No.: US 12,444,502 B2
(45) Date of Patent: Oct. 14, 2025

(54) ENSEMBLE MACHINE-LEARNING MODELS TO DETECT RESPIRATORY SYNDROMES

(71) Applicant: The COVID Detection Foundation, Los Altos, CA (US)

(72) Inventor: Amil Khanzada, Fremont, CA (US)

(73) Assignee: The COVID Detection Foundation, Los Altos, CA (US)

( * ) Notice: Subject to any disclaimer, the term of this patent is extended or adjusted under 35 U.S.C. 154(b) by 669 days.

(21) Appl. No.: 17/393,113

(22) Filed: Aug. 3, 2021

(65) Prior Publication Data
US 2022/0037022 A1   Feb. 3, 2022

Related U.S. Application Data

(60) Provisional application No. 63/117,394, filed on Nov. 23, 2020, provisional application No. 63/060,297, filed on Aug. 3, 2020.

(51) Int. Cl.
*G16H 50/20* (2018.01)
*G06N 5/04* (2023.01)
*G10L 25/66* (2013.01)
*G16H 10/60* (2018.01)
*H03M 7/30* (2006.01)

(52) U.S. Cl.
CPC ............ *G16H 50/20* (2018.01); *G06N 5/04* (2013.01); *G10L 25/66* (2013.01); *G16H 10/60* (2018.01); *H03M 7/3059* (2013.01)

(58) Field of Classification Search
CPC .......... G16H 50/20; G16H 10/60; G06N 5/04; G06N 5/01; G06N 20/20; G06N 3/082; G10L 25/66; H03M 7/3059; H03M 7/3082
See application file for complete search history.

(56) References Cited

U.S. PATENT DOCUMENTS

| | | | |
|---|---|---|---|
| 10,311,980 B2 | 6/2019 | Kim et al. | |
| 2014/0378810 A1* | 12/2014 | Davis | G06F 16/248 600/407 |
| 2015/0245788 A1* | 9/2015 | Schmidt | A61B 5/0823 600/586 |
| 2017/0236337 A1* | 8/2017 | Devries | G06T 19/20 345/419 |

(Continued)

FOREIGN PATENT DOCUMENTS

WO    2020044332 A1    3/2020

OTHER PUBLICATIONS

International Search Report and Written Opinion in related international application PCT/US2021/044272 dated Nov. 24, 2021.

(Continued)

*Primary Examiner* — Eliza A Lam
(74) *Attorney, Agent, or Firm* — Pillsbury Winthrop Shaw Pittman, LLP (57) ABSTRACT

Provided is a process including: obtaining, with one or more processors, a set of data comprising a plurality of patient records, selecting a subset of the plurality of parameters for inputs into a machine learning system, generating a classifier using the machine learning system based on the training data and the subset of the plurality of parameters for inputs; receiving, with one or more processors, patient record of a first user; performing an analysis, with one or more processors, to identify acoustic measures from a voice sample of the first user.

38 Claims, 3 Drawing Sheets

(56) References Cited

U.S. PATENT DOCUMENTS

| | | |
|---|---|---|
| 2019/0088367 A1 | 3/2019 | Stamatopoulos et al. |
| 2019/0209022 A1* | 7/2019 | Sobol .................... A61B 5/681 |
| 2020/0075165 A1 | 3/2020 | Lieberman |
| 2020/0146623 A1* | 5/2020 | Anushiravani ......... G06F 18/00 |
| 2020/0381130 A1* | 12/2020 | Edwards ................ G10L 15/16 |

OTHER PUBLICATIONS

International Preliminary Report on Patentability for related International Patent Application PCT/US2021/044377 Issued Feb. 16, 2023, 6 pages.

Internet Archive of https://vitalsign.ai/ captured May 6, 2021.

* cited by examiner

ND MACHINE-LEARNING MODELS TO DETECT RESPIRATORY SYNDROMES

ENSEMBLE MACHINE-LEARNING MODELS TO DETECT RESPIRATORY SYNDROMES

CROSS-REFERENCE TO RELATED APPLICATIONS

This patent claims the benefit of U.S. Provisional Patent Application 63/060,297, filed 3 Aug. 2020, titled Ensemble Machine-Learning Models to Detect Respiratory Syndromes, and U.S. Provisional Patent Application 63/117,394, filed 23 Nov. 2020, titled CROSS-CONTINENTAL APPLICABILITY OF CROWDSOURCED AND CLINICAL DATASETS FOR AI DETECTION OF COVID-19 FROM COUGH. The entire content of each afore-listed patent filing is hereby incorporated by reference for all purposes.

BACKGROUND

1. Field

The present disclosure relates generally to computer models to detect infections and, more specifically, to machine learning models to detect individuals infected with respiratory viruses and other pathogens.

2. Description of the Related Art

With the spread of COVID-19, more than 73-million COVID-19 cases have been found across the world. At the same time, the clinical diagnosis of COVID-19 can be time exhaustive and financially expensive for people, especially those in distant areas where COVID-19 clinical resources are limited.

SUMMARY

The following is a non-exhaustive listing of some aspects of the present techniques. These and other aspects are described in the following disclosure.

Some aspects include a computer implemented method, including: obtaining, with one or more processors, a set of data comprising a plurality of patient records, wherein: each patient record includes a plurality of parameters and corresponding values for a patient; the plurality of parameters and corresponding values for a patient comprises an audio file of patient's vocal noises, such as cough, breathing, or speech; and the set of data also includes a diagnostic indicator indicating whether or not the patient has been diagnosed with COVID-19; selecting a subset of the plurality of parameters for inputs into a machine learning system, wherein: the subset of the plurality of parameters comprises at least two parameters and corresponding values for the patient; and one of the parameters of the subset of the plurality of parameters is the audio file of patient's cough; partitioning the set of data into training data and validation data; generating a classifier using the machine learning system based on the training data and the subset of the plurality of parameters for inputs; receiving, with one or more processors, patient record of a first user; performing an analysis, with one or more processors, to identify acoustic measures from a voice sample of the first user; determining, using the classifier, a likelihood of COVID-19 infection of the first user based upon the identified acoustic measures of the voice sample of the first user; and outputting the likelihood of COVID-19 infection of the first user.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of machine learning. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Machine learning algorithms can potentially be a powerful tool for a preliminary indication of a person's COVID-19 status. Some embodiments implement such models to accurately infer COVID-19 infection from smartphone-acquired voice sounds and images. With smartphone usage high and continually rising, even among economically disadvantaged communities, these devices are expected to be an ideal platform for a widespread low-cost collection of respiratory audio recordings and for implementing audio-based COVID-19 testing. That said, the present techniques have use on other platforms, e.g., public kiosks, desktop computers, servers receiving similar data from a remote client device, and the like.

Some forms of computer-implemented COVID-19 voice analysis are often limited to a single channel of information, e.g., solely audio, which is expected to result in lower accuracy and specificity than is expected to be attainable with a broader set of features and the appropriate ensemble model.

In some embodiments, a native application may operate on raw data or inputs subject to preprocessing, filtering, and feature extraction before eventual model training (if during training) or inference (e.g., to classify a set of inputs as being indicative of COVID-19 infection). Some embodiments ensemble multiple (in some cases, heterogenous) machine learning models, training and inferring classifications from more channels of inputs than voice audio. Or some embodiments may operate exclusively on audio. In some embodiments, a machine learning model may operate by fusing multiple channels of input data. For audio, for example, some embodiments may, for example, use both Mel Frequency Cepstral Coefficients (MFCCs) and Mel-spectrograms to train a deep neural network, and some embodiments may combine this models outputs with those of a computer vision model operative to infer COVID-relevant features from images in an ensemble machine learning model.

Some embodiments execute on a smartphone (e.g., exclusively as a monolithic application, or as part of a distributed application partly executed on a remote server) and acquire multiple channels of data about a user, examples of which are described below. In some cases, audio or images are acquired from other sources, like a user's phone making a phone call to a call center or a smart speaker or other hosts of audio-based digital assistants, such sources also being examples of mobile computing devices of the user for the present purposes. Some embodiments respond with a classification (e.g., performed locally, or by a remote server) in real time (e.g., within less than one minute of data acquisition or less than ten minutes) of COVID-19 status (or other syndromes). Some embodiments use sensory hardware present in the smartphone. Some embodiments use a single modality testing, while other embodiments combine various modalities in an ensemble approach to potentially enhance accuracy (e.g., as measured by sensitivity, specificity, type 1 errors, type 2 errors, or F2 score). In some embodiments, users may be asked, via a user-interface of a native application on their smartphone, to perform a variety of actions by which inputs to various upstream sub-models feeding into the ensemble model are acquired, including filling in textual questionnaires, breathing or coughing into the phone's microphone, speaking within an audible range of the microphone, taking videos or photos of their finger or other appendages or their face or other bodily emissions (e.g., stool, saliva, blood, mucus, etc.), and authorizing data acquisition from wearable devices (like wrist-mounted pulse oximeters, inertial-measurement units (such as step counters), heart rate sensors, temperature monitors, and the like).

Figure 1:
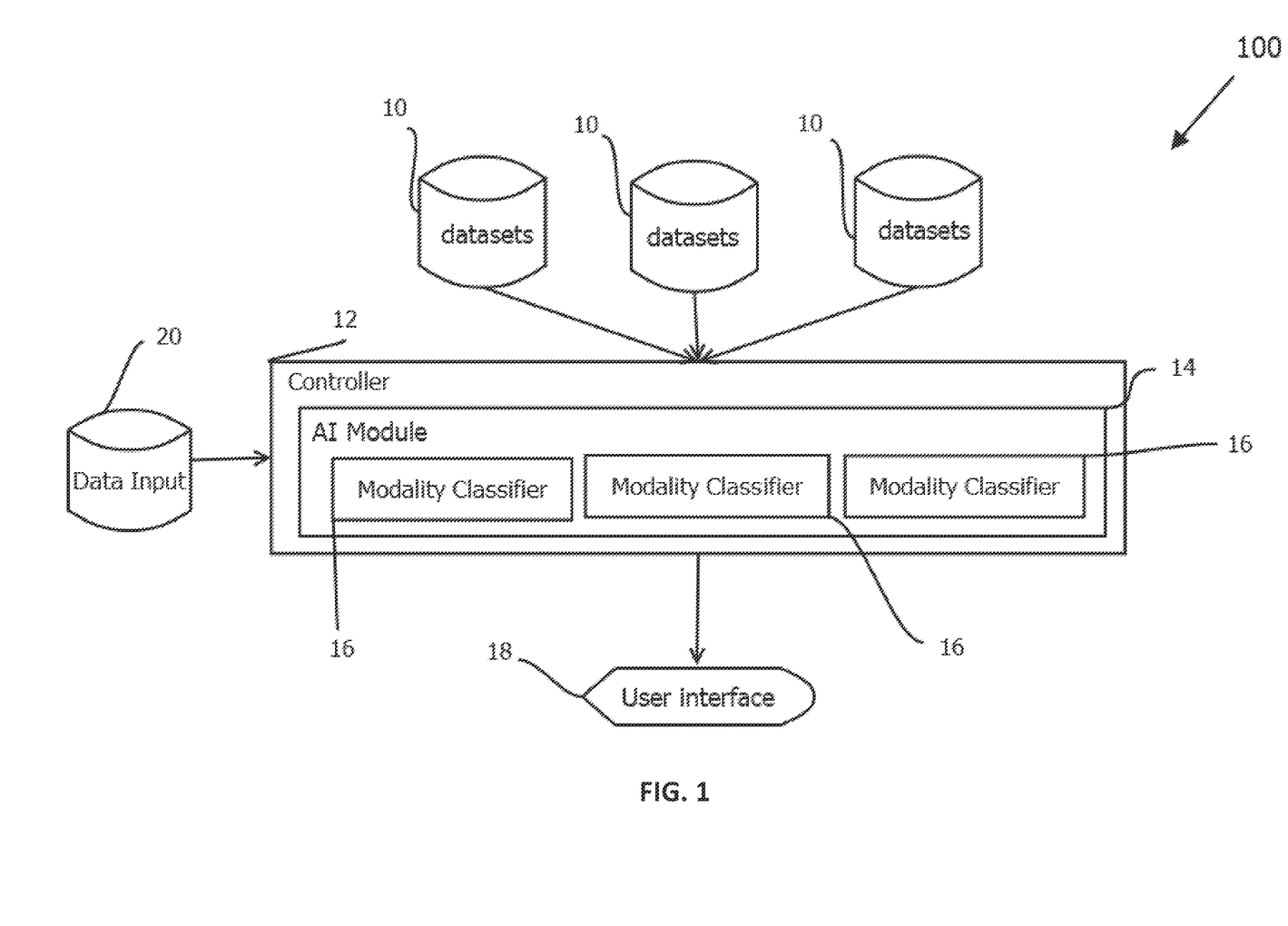
FIG. 1 is a block logical and physical architecture diagram showing an embodiment of a controller configured to classify data as indicative of infection in accordance with some of the present techniques.

FIG. 1 is a schematic block diagram of an example of a controller 12, operating within a computer system 100, in which the present techniques may be implemented. A variety of different computing architectures are contemplated. As such, the term "computer system" is used to be generic to a single computing device (which could be, for example, a smartphone or a server) and a collection of computing devices (which could include, for example, both a smartphone and a plurality of different servers in a microservices architecture, with each device performing different subsets of the tasks performed by the computer system). In some embodiments, some or all of the components of the controller 12 may be hosted by different entities, e.g., in a client-server architecture, where model training or inference is performed server side and data is acquired client-side from smartphones. In some cases, models are trained server-side, but inference is performed client side using a trained model downloaded to the native application. In some embodiments, the controller 12 and the components thereof may be implemented as a monolithic application, for instance, with different illustrated components implemented as different software modules or processes that communicate with one another, for instance via function calls, or in some cases, some or all of the components may be implemented as different processes executing concurrently on a single computing device. In some embodiments, some or all of the illustrated components may be implemented as distinct services executing on different network hosts that communicate with one another via messages exchanged via network stacks of the respective hosts, for instance, according to application program interfaces of each of the distinct services.

In some embodiments, the computing system 100 may include and train models on multiple source datasets 10 and the controller 12 may be operative to cause a computing device, like a smartphone, to present a user interface 18. In some embodiments, the controller 12 may include an artificial intelligence (AI) module 14 (such as one implementing a machine-learning model), with multiple modality classifiers 16 (e.g., cough classifier, deep breathing analysis, temporal data analysis, facial video, fingertip video, and biometric images). Classifiers 16 may be operative to classify inputs according to whether they indicate infection, or some embodiments of classifiers 16 may extract features from inputs for down-stream processing by an ensemble model.

In some embodiments, the controller 12 may be configured to execute the process 200 described below with reference to FIG. 2. In some embodiments, different subsets of this process 200 may be executed by the illustrated components of the controller 12, so those features are described herein concurrently. It should be emphasized, though, that embodiments of the process 200 are not limited to implementations with the architecture of FIG. 1, and that the architecture of FIG. 1 may execute processes different from that described with reference to FIG. 2, none of which is to suggest that any other description herein is limiting.

Figure 2:
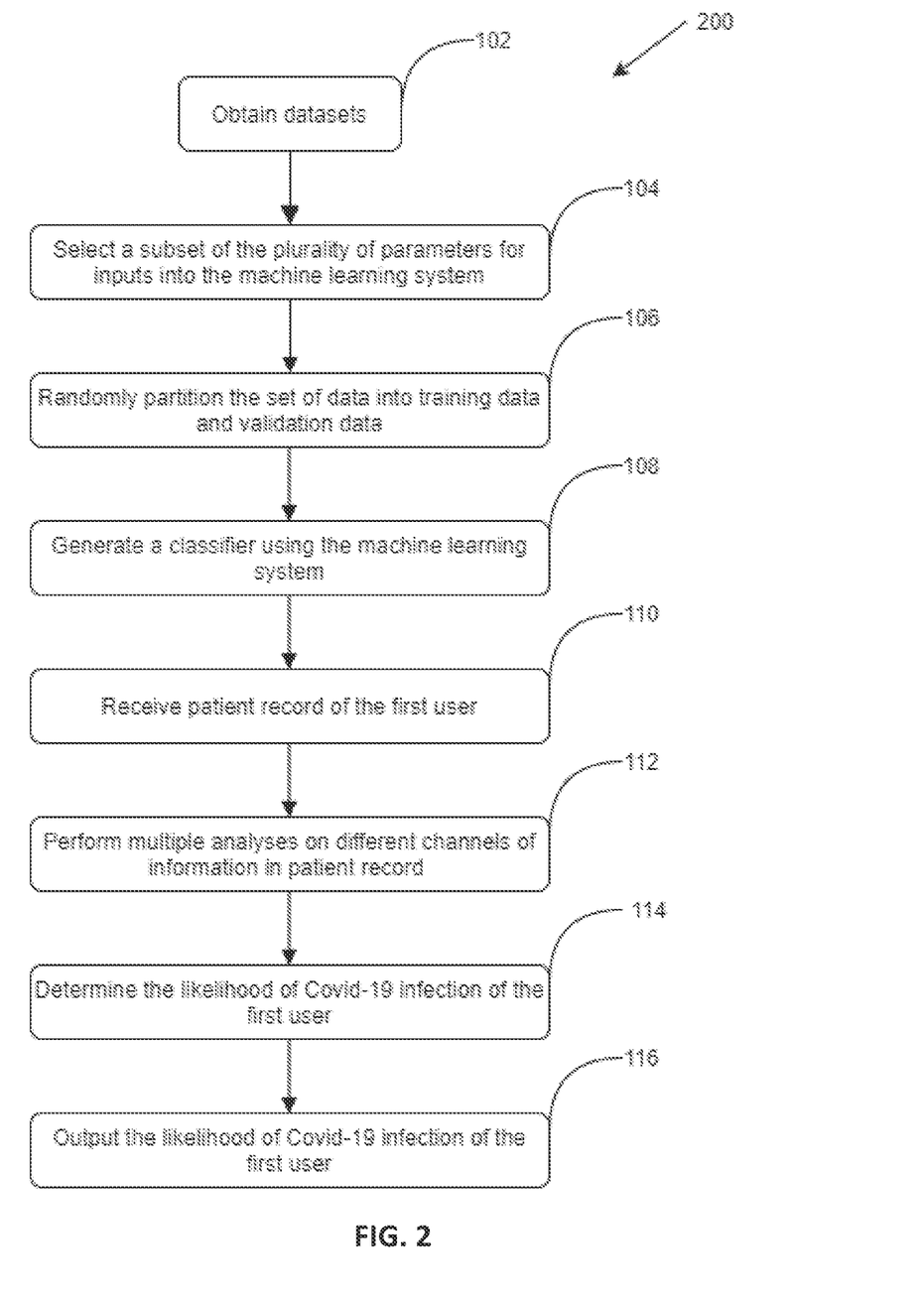
FIG. 2 is a flowchart showing an example of a process by which a likelihood of COVID-19 infection is determined using a machine learning model in accordance with some of the present techniques.

In some embodiments, the process 200 includes obtaining, as indicated by block 102 in FIG. 2, multiple datasets of training data. The training data may be labeled data for supervised training or unlabeled for unsupervised learning or semi-supervised learning. Examples include labeled datasets for the same channels of input data used for inference. In some cases, each training set includes inputs in each channel, along with a label indicating whether the person had COVID-19, when they contracted COVID-19, what stage of their infection they were undergoing at the time the samples where taken, whether the person was hospitalized, demographic data, comorbidities, complications from their infection, and whether the person died from their infection. In some cases, the described models may also be used to infer likelihood of hospitalization or death. In some cases, some of the input channels of information may include these fields of data entered by the user when filling out a survey presented through the UI 18.

In some embodiments, a subset of the plurality of parameters may (e.g., one or more of a plurality of input channels) be selected as inputs into the AI module (e.g., a machine learning model), as indicated by block 104. In some embodiments, textual questionnaires may be used to enhance its confidence in COVID-19 predictions.

In some embodiments, a user may be evaluated for potential infections by COVID-19 (SAR-CoV-2) or other pathogens using a smartphone or medical devices. Depending on the type of the modalities, the smartphone or the medical device might have a camera (such as one with a high-resolution (e.g., greater than 1 megapixel) complementary metal-oxide semiconductor (CMOS) image sensor), a temperature sensor, global positioning system (GPS) sensor, accelerometer, gyroscope, magnetometer, ambient light sensor, microphone, a touchscreen interface, oxygen-level sensors (e.g., Apple™ watch series 6), etc.

In some embodiments, deep breathing (e.g., greater than 80% of maximum breath depth) analysis for COVID-19 detection may also be used. Although the predictive accuracy of this modality is currently believed to be inferior to voice due to faintness in signal strength, it is still expected to be significantly above random guess and useful as an additional confidence metric in the ensemble model. In some cases, different forms of audio input, e.g., coughing, reading a specified phrase, reciting of a syllable (e.g., asking the user to say "aaaaaaaah" or "eeeeeee" for 5 seconds), and deep breathing, may each constitute a different channel of input. The audio input may be captured with a microphone of the user's smartphone.

In some embodiments, temporal data analysis may be used. By using data from the same patient using a user-interface to record data multiple times throughout days and weeks, the algorithm is expected to be able to infer the user's stage in the COVID-19 disease and predict development of the disease and outcomes. In some cases, even after COVID-19 recovery, patients' ear, nose, throat, and lung tissue are still affected, along with the presence of antibodies. It is expected that the biophysical differences caused by these changes are detectable by some embodiments, and some embodiments may infer COVID-19 immunity from such data.

Some embodiments may obtain an image (or collection of images, like in a video) and perform facial image analysis, e.g., from a camera of the user's smartphone. Some embodiments detect (e.g., on the client device or server-side) distinct features in the faces of COVID-19 positive and negative patients, such as lip color which tends to be bluish in COVID-19 patients due to lack of oxygen and variations in skin color/texture. Some embodiments infer from facial video various conditions such as heart rate, heart rate variability, oxygen saturation, and respiratory rate based on the varying intensity of redness on the face (due to blood flow around vessels).

Detection of COVID-19 from speech may also be used in some embodiments. Some embodiments may also infer age, gender, and ethnicity as features from the speaker's voice, to further bolster the effectiveness of the system in accurately detecting a COVID-19 carrier. Or in some cases, these features may be entered by the user in a survey presented via the UI 18.

Some embodiments may obtain (e.g., from a camera of a mobile device) and process fingertip video (or individual images), which may be used to measure and record blood oxygen level and heartbeat rate. COVID-19 patients have affected respiratory systems often leading to decreased oxygen intake, which is expected to be detectable by visual features indicative of lowered oxygen levels in the blood vessels of fingers (e.g., from color). In some cases, the user may be asked to shine alight through their finger during imaging. Similarly, patients with COVID-19 often experience increased or irregular heart rate, a possible complication of COVID-19 consistent with the increased difficulty of oxygen intake. Some embodiments implement an pulse oximeter with a smartphone, in which a video of one finger firmly pressed to the camera lens with flash on can serve as a proxy for photoplethysmography (PPGs) through analysis of the intensity of captured red pixels (e.g., intensity of the red channel, and variation thereof over time). Furthermore, the acquired PPG may be further analyzed for heart rate by some embodiments to infer various patient vitals. For example, some embodiments implement the techniques in the following paper, which is hereby incorporated by reference: Hasan et al, SmartHeLP: Smartphone-based Hemoglobin Level Prediction Using an Artificial Neural Network, AMIA Annu Symp Proc. 2018 Dec. 5; 2018:535-544. eCollection 2018, PMID: 30815094 PMCID: PMC6371334.

In some embodiments, biometric images may be used to identify COVID-19 infected individuals. COVID-19 may affect various biophysical systems of the body. Some embodiments may detect the differences in various body secretions such as saliva, stool, urine, vomit, and mucus by analyzing images of the same captured with the user's smartphone. It is expected that subtle differences in images of these substances correlated with COVID-19 may be detected by some embodiments. For example, population statistics of dimensions (and color) of blobs detected with a blob detection algorithm with a known reference dimension (like a credit card) in the field of view (or on such a surface at a specified angle) may be indicative of viscosity, surface tension, or other attributes of such fluids that correlate with COVID-19 infection. Patient-reported surface tension and/or color variations may also be used as input features by some embodiments.

On-mobile-device audio/image compression may be tuned to enhance inference in some embodiments. Some embodiments of the described machine learning models are expected to be able to pick up COVID-19 from signals indistinguishable to the human eye and ear, which are often destroyed by traditional lossy compression techniques. Some embodiments may adjust audio compressing/decompressing of data to preserve features relevant to COVID-19 classification by such models. For example, some embodiments may implement more lossy compression of some frequencies audible to humans while favoring less lossy compression of frequency ranges determined to correlate with COVID-19. Similar techniques may be applied to image compression (for instance with video compression), for example by tuning a quantization matrix to preserve relevant features. In some cases, compression may be tuned by applying techniques to the trained machine learning models to enhance their interpretability, examples including measuring the effect of pruning certain parts of a neural network on F2 scores. A pruned portion of the model (e.g., a perceptron, a convolutional filter, a connection, etc.) having a relatively large effect on F2 score may be presumed to be important, and some embodiments may measure the effect of various compression parameters on the feature output by those portions of the model to determine which parameter values preserve accuracy while making acceptable tradeoffs in compression.

Some embodiments may include a plurality of upstream sub-models that produce outputs combined in a downstream ensemble model that outputs the ultimate classification. In some cases, each of the above modalities that are expected to have discriminatory ability may have a different sub-model, or they may be combined. In some cases, each sub-model is separately and independently trained, optimizing for accuracy in COVID-19 (or, as is the case with each reference to COVID-19, other respiratory diseases) detection. Or in some cases, end-to-end training may be applied in a single global optimization, an approach which is expected to be more computationally resource intensive due to the number of model parameters for which memory is needed concurrently.

Example techniques include stochastic gradient descent, simulated annealing, evolutionary optimization algorithms, and the like. In some cases, each of the sub-models is trained before the ensemble model is trained. Some embodiments randomly assign model parameter values, compute a partial derivative of each such parameter with respect to an objective function, adjust the parameters in a direction the partial derivative indicates will locally optimize the model, and then repeat such computations and adjustments until a change in the objective function between iterations is less than a threshold amount, indicating a local or global optimum. Some embodiments may repeat this process with different randomly assigned initial parameter values multiple times and select a version of the trained model that results in the most optimal result as measured by the objective function among these iterations.

A variety of architectures are contemplated for the ensemble model. Examples include deep neural networks, decision trees, random forests, regression trees, classification trees, Bayesian networks, and the like. Methods such as soft and hard voting, along with early fusion may be implemented. In some cases, these approaches may also be used in the sub-models. In some cases, some sub-models, such as those that process time series data (e.g., video or audio) may use transformer architectures, such as ones with multi-headed attention, or long-short-term memory models or other recurrent neural networks. In cases where training data (or positive examples therein) are particularly sparse, techniques like Siamese networks or triplet loss networks may be applied, in some cases, using time-contrastive networks for time series data.

In some embodiments, data augmentation (adding background audio noise such as white or gaussian noise, blurring images, etc.) and use of auxiliary data (auditory and visual datasets of various respiratory and other illnesses, etc.), may also be used to facilitate and improve the effectiveness of the algorithms.

In some embodiments, data collection may be multi-pronged in that it combines global grassroots crowdsourcing efforts with clinical studies and trials across various countries.

In some embodiments, the algorithms may be configured to detect and distinguish various diseases, including other coronaviruses such as the flu, common cold, SARS, and COVID-20, along with respiratory conditions such as whooping cough and asthma. Some embodiments may detect other disorders potentially detectable by speech (e.g. child abuse, domestic violence, depression, etc).

In some embodiments, the set of labeled training data may be partitioned into multiple different subgroups (e.g., training dataset and validation data set), as shown in block 106 of FIG. 2. In some cases, the training data may be a highly imbalanced dataset, due to positives being relatively rare. In some cases, data augmentation techniques may be applied to create a more balanced training dataset. By adding Gaussian or white noise (or other examples above), adjusting volume, pitch shifting, shifting the time signal and stretching the time signal, the number of COVID-19 labeled samples may be increased. Prior to the augmentation phase, the data may be split into training, validation and test datasets such that augmentation can be applied on each split separately. In some cases, each class may be represented by one third of the number of split samples, which is expected to make the distribution of data perfectly balanced for all classes.

In some embodiments, a classifier may be generated (e.g., trained) using machine learning techniques, as shown by block 108 in FIG. 2. In some embodiments, a deep neural network may be trained using the openly available datasets of cough sounds, with COVID-19 status labels, such as Coswara, Coughvid, and Iatos.

In some embodiments, additional datasets with more detailed labels may be compiled beyond the Coswara and Coughvid crowdsourced data to verify the model's performance. All data may have COVID-19 PCR labels and may be acquired in conditions that were meant to simulate real-world usage. Audio files may be a mixture of compressed and uncompressed files (e.g., wav, ogg, flac, webm, and mp3 files) depending on the mode of data acquisition. Potential privacy risks and security threats may be addressed through localized privacy policies and patient consent forms, along with a Data Protection Impact Assessment (DPIA) and several internal information security policies. In some cases, datasets are anonymized and encrypted both at rest and in flight.

In some embodiments, samples used within the models are crowdsourced using a mobile data collection app to mimic one potential use case of COVID-19 detection from voice by smartphone users in the general public.

In some embodiments, to determine performance of a COVID-19 detection algorithm in a clinical setting, samples may be collected in hospital clinics using smartphones. The explicit patient consent forms electronically accepted by all patients are originally drafted in advance. The data is captured directly from patients under the hospitals' Institutional Review Board (IRB) approved clinical research study protocols.

In some embodiments, multiple features from the crowdsourced datasets may be used to train the models. After searching on various features and architectures using grid search, an ensemble model of three features with the following parameters may be used. The first feature is mel-frequency cepstral coefficients (MFCCs), an audio feature derived from the short-term power spectrum. Each voice audio file may be resampled to 22.5 kHz and the first 39 MFCCs may be extracted using the librosa package, with a sampling rate of 22.5 kHz, hop length of 23 ms, window length of 93 ms, and a Hann window type. Outputs may be averaged across the time-axis to yield mean 39 MFCCs features for each audio file.

In some embodiments, the second extracted feature may be the mel-frequency spectrogram, another audio feature. Though MFCCs are derived from the spectrogram, the spectrogram encodes raw power information without any transformations. Spectrograms may be extracted using the librosa package with the same parameters as for the MFCCs and interpolated to size.

In some embodiments, the way in which audio features are extracted from voice audio files may affect model performance. There are expected to be several useful features to train the network on, such as mel-frequency cepstral coefficients and mel-frequency spectrograms, both being audio features. In some embodiments, heterogeneous classifiers may be used, one of them being trained on mel-spectrograms and the other being trained on MFCCs. Each voice audio file may be downsampled to half the original frequency (22.5 KHz) and split into 3 second chunks. The first 13 MFCCs may be extracted from the preprocessed sound chunks using the librosa package in python, with a Hann window type of 10 ms for hop-length and 20 ms for win-length.

In some embodiments, the mel-spectrograms may be extracted using the librosa package for the same parameters used to extract MFCCs. Each mel-spectrogram color image may be reshaped to the size of (224,224,3), the original input size of the ResNet-50 convolutional neural network. Also, other useful clinical information in the COUGHVID dataset such as history of respiratory conditions and symptoms such as fever may be used to further increase the accuracy of the model in predicting COVID-19 infected individuals. This clinical information may be passed in a one-dimensional vector of binary numbers as each binary number represents the presence or absence of a symptom or a condition.

In some embodiments, the different types of features extracted from the voice audio chunks may be stored in a hash-table with a key for each record. The data may be randomly (e.g., pseudorandomly) grouped into training validation-test sets using an 80-10-10 split.

In some embodiments, slice-based analysis may be performed and divided the test data-set into groups based on age and gender. According to age, the test data-set may be split into multiple groups. For example, in the case of four groups, the first group being patients below 20 years old, second being patients between 20 and 40 years old, the third group being patients between 40 and 60 years old, and a fourth group being above 60 years old. Or some embodiments may group by ages 18-30, 30-45, 46-60, and then older. For gender, the test data-set may be split into corresponding groups.

In some embodiments, the model is a multi-branch ensemble learning architecture based on a ResNet-50 3D convolutional neural network that is pre-trained on ImageNet dataset and stripped of the top layer (e.g., classification layer). The input for the CNN may be a mel-spectrogram color image of size (224 pixels, 224 pixels, 3 RGB layers, or larger or smaller in any of these dimensions) and the output of the CNN may be passed to both a global average pooling layer and a global maximum pooling layer in two separate and parallel links. Each of these layers may be followed by batch normalization and dropout layers before concatenated together in a single dense (e.g., non-linear, like layers with a sigmoid or hyperbolic tangent activation function) layer to make the first branch.

In some embodiments, a second branch may be a multi-layer feedforward neural network including two dense layers that are of 8 nodes and 64 nodes, respectively. And each layer may be followed by a batch normalization and dropout layers. The input for the first branch may be an ID vector of binary numbers. Each binary number may encode one of the clinical features associated with the patient record, such as history of respiratory diseases, type of cough and whether the patient has fever or not. This branch is expected to upscale the clinical information.

In some embodiments, a third branch may be a double parallel feedforward neural network that takes a vector of mel-frequency cepstrum coefficients as an input vector of size (13, 1, or larger or smaller in either of these dimensions). Each of the two parallel links may be a multi-layer feed forward neural network that includes two layers, where each layer may be followed by a batch normalization and a dropout layer. The high ends of both links may be concatenated together in a single dense layer.

In some embodiments, the extracted high-level features at the high end of the three branches may be fused together before being passed to a sequential feed-forward neural network (SFFN) that is followed by a softmax layer for a multi-label classification task. The three labels are as follows for some embodiments: negative COVID-19 (healthy), negative COVID-19 (Symptomatic) and positive COVID-19. Other embodiments may include more, like negative with low confidence, negative with high confidence, positive with low confidence, positive with high confidence, and indeterminate. Or some embodiments may output a real number score, such as a value between 0 and 1, where higher values indicate greater strength of the inference that the person is infected.

In some embodiments, the network architecture may use several heterogeneous classifiers and fuse together the extracted high-level features from spectrogram images, using ResNet-50 CNN (convolutional neural networks), and from MFCCs using a deep neural network. The network architecture, number of hidden layers for each branch, and number of units per each layer are hypermaters that may be determined using a grid-search. The model may be trained using categorical cross entropy loss, a stochastic gradient descent optimizer with a learning rate of 1e-2 and 2500 decay steps.

Beyond audio files, each sample may also contain additional rich information that has potential to enhance prediction accuracy. In some embodiments, two additional features for each voice file may be used that reflect the clinical picture of the patient. Detectable changes in cough sounds have been shown to occur with diseases other than COVID-19. Therefore, a binary label about the presence or absence of current respiratory diseases may be aggregated to feed into the algorithm as one extra feature. Next, COVID-19 also presents with other symptoms than cough, with some of the most common being fever and myalgia (muscle pain). The presence or absence of these symptoms may also impact the probability of having COVID-19. In some embodiments, a second binary label of fever or myalgia status may also be aggregated from all datasets and fed into the model as a second extra feature.

Various architectures may be used to maximize the accuracy of detecting COVID-19 infected individuals. In some embodiments, 1D and 2D CNNs, LSTM, and CRNN architectures may be used, individually or combination.

In some embodiments, an ensemble of 3 separate networks may be used, and the ensemble's structure and hyper-parameters may be fine-tuned using grid search to minimize overfitting. Outputs from each network may be aggregated to predict the probability of having COVID-19.

In some embodiments, the first network is for the MFCCs with input size of (39,) and includes two hidden layers with ReLU (rectified linear activation function) activation, each followed by a dropout layer. The second network may be a convolutional neural network with the mel-spectrogram image as input of size (64,64,1). It may include three 2D convolution layers, with a kernel size of 3 and a stride size of 2 for the first convolution layer and a kernel size of 3 and a stride size of 1 for the rest two convolution layers, each followed by a 2D average pooling, a batch normalization, and a ReLU activation. The last network is for each sample's two extra features of fever/myalgia and respiratory conditions. Similar to the first network, it may include two hidden layers with ReLU activations, each followed by a dropout layer. Outputs from each network may be aggregated, fed through two additional hidden layers, each followed by a ReLU activation function, and combined into a final sigmoid (activation function) output decision layer.

In some embodiments, the ensemble network may be trained using cross entropy loss, an Adam optimizer, and learning rate of 0.001. The training data may be randomly split into train-validation-test datasets using a 70-15-15 split. Each training instance may be repeated five times, each with a different random data split. The mean statistical values and 95% confidence intervals may be reported and stored in memory.

In some embodiments, both accuracy and area under the ROC (receiver operating characteristic) curve (AUC) may be used as evaluation metrics. As the training data may be unbalanced, AUC may be a better presentation of how the model is working.

In some embodiments, longitudinal crowdsourced studies and clinical studies across various countries may be conducted to train a machine learning algorithm with more information about human respiratory sound features, including cough and speech (or other forms of voice), both before symptom onset and over the course of COVID-19 infection. After gathering more audio data in association with PCR and evolving in vitro COVID-19 diagnostics, demographics, and disease course labels, sub-analyses may be performed to validate an ML model's performance in a multitude of conditions and demographic groups.

In some embodiments, the machine learning algorithms include decision tree learning, artificial neural networks, deep learning neural networks, support vector machines, rule-based machine learning, random forest, etc. Algorithms such as linear regression or logistic regression may be used as part of a machine learning process.

In some embodiments, support vector machines (SVMs) may be used as supervised learning models that analyze data for classification and regression analysis. SVMs may plot a collection of data points in n-dimensional space (e.g., where n is the number of clinical parameters), and classification is performed by finding a hyperplane that can separate the collection of data points into classes. In some embodiments, hyperplanes are linear, while in other embodiments, hyperplanes are non-linear. SVMs are effective in high dimensional spaces, are effective in cases in which the number of dimensions is higher than the number of data points, and generally work well on data sets with clear margins of separation.

In some embodiments, decision trees may be used as a type of supervised learning algorithm also used in classification problems. Decision trees may be used to identify the most significant variable that provides the best homogenous sets of data. Decision trees split groups of data points into one or more subsets, and then may split each subset into one or more additional categories, and so forth until forming terminal nodes (e.g., nodes that do not split). Various algorithms may be used to decide where a split occurs, including entropy, Gini impurity, Chi-Square, Information Gain, or Reduction in Variance. Decision trees are often helpful to rapidly identify the most significant variables among a large number of variables, as well as identify relationships between two or more variables. Additionally, decision trees may handle both numerical and non-numerical data. This technique is generally considered to be a non-parametric approach, e.g., the data does not have to fit a normal distribution.

In some embodiments, random forest (or random decision forest) may be used as a suitable approach for both classification and regression. In some embodiments, the random forest method constructs a collection of decision trees with controlled variance. Generally, for M input variables, a number of variables (nvar) less than M is used to split groups of data points. The best split is selected and the process is repeated until reaching a terminal node. Random forest is particularly suited to process a large number of input variables (e.g., thousands) to identify the most significant variables. Random forest is also effective for estimating missing data.

In some embodiments, deep learning neural networks, another machine learning technique, may be used. These networks may have multiple hidden layers and are capable of automatically performing operations (e.g., feature extraction) in an automated manner.

In some embodiments, in order to train the machine learning system, the set of data is randomly partitioned into training data and validation data. A classifier is generated using the machine learning system based on the training data, the subset of inputs and other parameters associated with the machine learning system as described herein. It is determined whether the classifier meets a predetermined Receiver Operator Characteristic (ROC) statistic, specifying a sensitivity and a specificity, for correct classification of patients. In embodiments, the specificity and sensitivity metrics may be optimized to align with FDA and WHO standards for medical devices, e.g. above 90% specify and above 80% sensitivity for antigen testing.

When the classifier does not meet the predetermined ROC statistic, the classifier may be iteratively regenerated based on the training data and a different subset of inputs until the classifier meets the predetermined ROC statistic. When the machine learning system meets the predetermined ROC statistic, a static configuration of the classifier may be generated. This static configuration may be deployed to a physician's office or healthcare provider for use in identifying patients at risk of having COVID-19 or stored on a remote server that can be accessed by the physician's office or healthcare provider. In some cases, results may be written to a patient's file on an electronic medical record system.

In some embodiments, the exact nature and duration of the cough may vary from one disease to another, but the intensity (strength), frequency (number of occurrences) and the duration for which a cough lasts (time since onset) are variables that may help identify infectious disease (e.g., COVID-19) and differentiate an individual with an infectious disease from non-infectious conditions. For example, unlike certain acute conditions (e.g., COVID-19), the cough resulting from infectious diseases typically lasts for longer durations. Some conditions, such as tuberculosis, can result in a cough lasting several weeks.

In addition, one marker of airway infections is a change in voice quality resulting from factors such as laryngeal inflammation or upper airway obstruction. In some embodiments, by combining information about voice behavior with other biometric parameters (e.g., oxygen level), the likelihood of COVID-19 may be determined. Some embodiments may obtain a pre-infection voice audio sample and a recent audio voice recording. Some embodiments may compute differences between the two (e.g., frequency) and use the difference as an input feature.

In some embodiments, an audio stream received via a phone/microphone (e.g., mobile phone, VoIP, internet, etc.) is analyzed by segmenting the audio stream into short windows, computing acoustic measures from each window (e.g., mel-frequency cepstral coefficients), comparing the acoustic measures across successive windows, developing and training a machine learning pattern recognition engine to identify acoustic patterns of a cough, and determining the likelihood of a particular window (or set of windows) to contain an instance of a cough.

Once a cough (or other target voice sample) is detected in the audio stream, the frequency, intensity, or other characteristics of the cough signals may be extracted and used as model input features (or intermediate features) to distinguish between diseases (e.g., COVID-19 and a seasonal cold). For example, some conditions may result in a 'wet' cough characterized by a gurgly voice quality and others may be characterized by a 'dry' cough (e.g., associated with COVID-19 patients) characterized by a hard onset (rapid attack time) followed by aperiodic (noise) energy.

In some embodiments, a first user may be asked for his/her patient record (which may be fully or partially, to the extent possible, anonymized and in some cases may omit personally identifiable information and health status information unrelated to the analysis at hand), as shown by block 110 of FIG. 2, as data input 20 into the controller 12 of FIG. 1. In some embodiments, users may be asked, via a user-interface of a native app, to perform a variety of actions by which inputs to various upstream sub-models feeding into the ensemble model are acquired, including filling in textual questionnaires, breathing or coughing into the phone's microphone, reading sentences within range of the microphone, taking videos of their finger or other appendages, authorizing data acquisition from wearable devices (like wrist-mounted pulse oximeters, inertial-measurement units (such as in step counters or smartphones configured to extract features of the user's gait), heart rate sensor, temperature, and the like).

Based on the patient record, multiple different analyses may be performed (e.g., cough classifier, deep breathing analysis, temporal data analysis, facial video, fingertip video, and biometric images), as shown by block 112 of FIG. 2, to evaluate the likelihood of COVID-19 infection of the first user, as shown by block 114 of FIG. 2.

In some embodiments, the voice behavior of an individual may be tracked over a longer period of time (e.g., by repeating the described sample acquisition process and re-processing the new data) to determine how the cough changes over time. Changes, and rates thereof, may serve as features of the described models. A rapid change in cough (or other voice) behavior or an escalation that is maintained over a prolonged period of time may indicate specific disease conditions.

In some embodiments, a voice sample may be used to determine new clinically relevant outcome variables, the cough arousal index (CAI) and a cough disturbance index (CDI). This CAI reflects the number of nocturnal coughs associated with an electroencephalographic (EEG) arousal during each hour of sleep. If nocturnal coughs are not associated with an EEG arousal, they are counted in a cough disturbance index (CDI) which is defined by the number of coughs per hour of sleep not associated with an arousal. These new indices may be used for medical management of individual patients and also for medical research, for example, for the understanding of the antitussive and/or pro-tussive profiles of pharmacological compounds.

In some embodiments, the user is then informed of the likelihood of COVID-19 infection via a user interface, as shown by block 116 of FIG. 2, for instance by updating the user interface 18 to present such information on their mobile computing device, like a smartphone. In some embodiments, machine learning models are expected to be able to classify individuals having a likelihood of COVID-19 infection with at least 70%, 75%, 80%, 85%, 90%, 95%, 98%, or 99% sensitivity when the specificity is set at 80%. This is expected to be better than linear statistical models, such as threshold classification with a single variable or multivariate logistic regression with multiple variables. In some embodiments, at least a 5% improvement, at least a 10% improvement, at least a 15% improvement, at least a 20% improvement, at least a 25% improvement, or at least a 30% improvement is achieved using machine learning techniques as compared to traditional statistical methods such as traditional logistic regression or multivariate linear regression.

Figure 3:
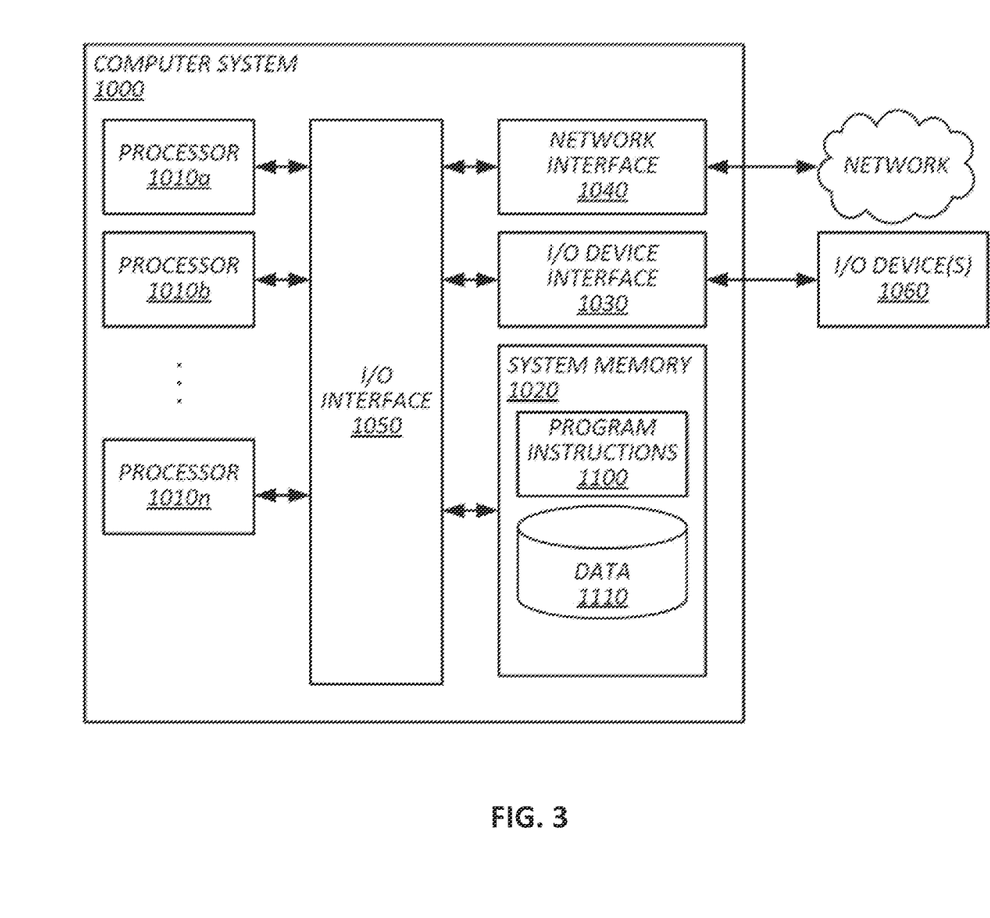
FIG. 3 shows an example of a computing device by which the above-described techniques may be implemented.

FIG. 3 is a diagram that illustrates an exemplary computing system 1000 by which embodiments of the present technique may be implemented. For example, the features of system 1000 may be present in both a smartphone and in a server like those described above. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) and/or a graphics processing unit (GPU) that carry out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, accelerometers, global positioning system (GPS) sensor, accelerometer, gyroscope, magnetometer, ambient light sensor, microphone, a touchscreen interface, oxygen-level sensors, or the like. I/O devices 1060 may be connected to computer system 1000 through a wired or wireless connection. I/O devices 1060 may be connected to computer system 1000 from a remote location. I/O devices 1060 located on remote computer systems, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard, Bluetooth, WiFi, or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with a computer system, a trained machine learning model configured to infer whether users have a respiratory illness based on both audio and an image captured by mobile computing devices of the users, wherein the trained machine learning model is trained by: obtaining a training set comprising a plurality of training records, wherein: each training record in the training set includes a plurality of parameters and corresponding values for a respective person; each training record in the training set includes audio of the respective person's voice and an image of at least part of the respective person; and each training record in the training set includes an indicator indicating whether or not the respective person has been diagnosed with a respiratory illness; and training the machine learning model on the training set to infer whether users have the respiratory illness based on both the audio and images; after obtaining the trained machine learning model, receiving, with the computer system, a first user record of a first user, the first user record comprising an audio file or stream of a cough of the first user and an image of at least part of the first user; inferring, with the computer system, that the first user has the respiratory illness based on the audio file or stream of a cough of the first user and an image of at least part of the first user; and storing, with the computer system, an indication that the first user has the respiratory illness in memory.
2. The medium of embodiment 1, wherein the plurality of training records comprises at least two of the following: textual questionnaire answers; data indicative of breathing; temporal data; facial video; fingertip video; or biometric images.
3. The medium of embodiment 1, wherein the plurality of training records comprises each of the following: textual questionnaire answers; data indicative of breathing; temporal data; facial video; fingertip video; and biometric images.
4. The medium of any one of embodiments 1-3, wherein the plurality of training records comprises fingertip video, wherein the machine learning model is trained to use the fingertip video to measure blood oxygen level and heartbeat rate as features upon which inference is based.
5. The medium of any one of embodiments 1-4, the operations further comprising: steps for training the machine learning model.
6. The medium of any one of embodiments 1-5, wherein: training the machine learning model comprises computing partial derivatives of parameters of the machine learning model with respect to an objective function and adjusting the parameters of the machine learning model in directions the partial derivatives indicate locally optimize the machine learning model.
7. The medium of any one of embodiments 1-6, wherein the machine learning model a first output indicating COVID-19 infection and a second output indicating the stage of COVID-19 infection.
8. The medium of any one of embodiments 1-7, wherein: the machine learning model comprises means for fusing output of a plurality of sub-models.
9. The medium of any one of embodiments 1-8, wherein the operations further comprise: configuring lossy compression of the audio file or stream of the cough to preserve non-human perceivable data that affects accuracy of the trained machine learning model.
10. The medium of any one of embodiments 1-9, wherein: training the machine learning model is performed by a different set of computers of the computer system than a set of computers of the computer system that perform inferring the first user has the respiratory illness.
11. The medium of any one of embodiments 1-10, wherein: inferring that the first user has the respiratory illness is performed by a smartphone of the first user that is part of the computer system.
12. The medium of any one of embodiments 1-11, wherein: the trained machine learning model comprises an ensemble of at least three different neural networks having outputs combined with means for ensembling multiple sub-models.
13. The medium of any one of embodiments 1-12, the operations further comprising: performing a pre-processing of an audio cough sample, before inputting to the trained machine learning model, to clean the cough sample and select segments of the cough sample to be input to the trained machine learning model.
14. The medium of any one of embodiments 1-13, wherein the operations further comprise: extracting cepstral coefficients from an audio cough sample.
15. The medium of embodiment 14, wherein extracting the cepstral coefficients from the audio cough sample comprises: constructing a spectrogram from the audio cough sample; calculating a log-power for each frame from the spectrogram; applying a filter to a magnitude of the log-power; performing a log-compression and transform to a cepstral domain of an output of the filter; and forming a vector of cepstral coefficients for each frame.
16. The medium of any one of embodiments 1-15, wherein the operations comprise: extracting mel-frequency cepstral coefficients derived from a power spectrum of audio of a cough sample of a second user.
17. The medium of any one of embodiments 1-16, wherein the trained machine learning model comprises a multi-layer feedforward neural network comprising at least two non-linear layers.
18. The medium of any one of embodiments 1-17, wherein the Mel trained machine learning model comprises a double parallel feedforward neural network that takes a vector of mel-frequency cepstrum coefficients as an input.
19. A method, comprising: the operations of any one of embodiments 1-18.
20. A system, comprising: one or more processors; and memory storing instructions that when executed by the one or more processors effectuate operations comprising: the operations of any one of embodiments 1-18.

What is claimed is:
1. A tangible, non-transitory, machine-readable medium storing instructions that when executed by one or more processors effectuate operations comprising:
obtaining, with a computer system, a trained machine learning model configured to infer whether users have a respiratory illness based on both audio and an image obtained from mobile phones of the users, wherein the trained machine learning model comprises a double parallel feedforward neural network that takes a vector of mel-frequency cepstrum coefficients as an input, and wherein the trained machine learning model is trained by:
obtaining a training set comprising a plurality of training records, wherein:
each training record in the training set includes a plurality of parameters and corresponding values for a respective person;
each training record in the training set includes audio of the respective person's voice and an image of at least part of the respective person; and
each training record in the training set includes an indicator indicating whether or not the respective person has been diagnosed with a respiratory illness; and
training the machine learning model on the training set to infer whether users have the respiratory illness based on both the audio and images;
after obtaining the trained machine learning model, receiving, with the computer system, a first user record of a first user, the first user record comprising an audio file or stream of a voice of the first user and an image of at least part of the first user;
inferring, with the computer system, that the first user has the respiratory illness based on the audio file or stream of a voice of the first user and an image of at least part of the first user; and
storing, with the computer system, an indication that the first user has the respiratory illness in memory.
2. The medium of claim 1, wherein the plurality of training records comprises at least two of the following:
textual questionnaire answers;
data indicative of breathing;
temporal data;
facial image;
fingertip video; or
biometric images of skin, stool, mucus, urine, or vomit.
3. The medium of claim 1, wherein the plurality of training records comprises each of the following:
textual questionnaire answers;
data indicative of breathing;
temporal data;
facial image;
fingertip video; and
biometric images of skin, stool, mucus, urine, or vomit.
4. The medium of claim 1, wherein the plurality of training records comprises fingertip video, wherein the machine learning model is trained to use the fingertip video to measure blood oxygen level and heartbeat rate as features upon which inference is based.
5. The medium of claim 1, the operations further comprising:
steps for training the machine learning model.
6. The medium of claim 1, wherein:
training the machine learning model comprises computing partial derivatives of parameters of the machine learning model with respect to an objective function and adjusting the parameters of the machine learning model in directions the partial derivatives indicate locally optimize the machine learning model.
7. The medium of claim 1, wherein the machine learning model comprises:
at least two outputs, with a first output indicating COVID-19 infection and a second output indicating a stage of COVID-19 infection.
8. The medium of claim 1, wherein:
the machine learning model comprises means for ensembling output of a plurality of sub-models.
9. The medium of claim 1, wherein the operations further comprise:
configuring lossy compression of the audio file or stream of the person's voice to preserve non-human perceivable data that affects accuracy of the trained machine learning model.
10. The medium of claim 1, wherein:
training the machine learning model is performed by a different set of computers of the computer system than a set of computers of the computer system that perform inferring the first user has the respiratory illness.

11. The medium of claim 1, wherein:
inferring that the first user has the respiratory illness is performed by a smartphone of the first user that is part of the computer system.

12. The medium of claim 1, wherein:
the trained machine learning model comprises an ensemble of at least three different machine learning algorithms having outputs combined with means for ensembling multiple sub-models.

13. The medium of claim 1, the operations further comprising:
performing a pre-processing of an audio voice sample, before inputting to the trained machine learning model, to clean the voice sample and select segments of the voice sample to be input to the trained machine learning model.

14. The medium of claim 1, wherein the operations further comprise:
extracting cepstral coefficients from the audio file or stream of the voice of the first user.

15. The medium of claim 14, wherein extracting the cepstral coefficients comprises:
constructing a spectrogram from the audio file or stream of the voice of the first user;
calculating a log-power for each frame from the spectrogram;
applying a filter to a magnitude of the log-power;
performing a log-compression and transform to a cepstral domain of an output of the filter; and
forming a vector of cepstral coefficients for each frame.

16. The medium of claim 1, wherein the operations comprise:
extracting mel-frequency cepstral coefficients derived from a power spectrum of audio of a voice sample of a second user.

17. The medium of claim 1, wherein the trained machine learning model comprises a multi-layer feedforward neural network comprising at least two non-linear layers.

18. The medium of claim 1, wherein the operations comprise:
steps for inferring likelihood of COVID-19 infection.

19. A method, comprising:
obtaining, with a computer system, a trained machine learning model configured to infer whether users have a respiratory illness based on both audio and an image obtained from mobile phones of the users, wherein the trained machine learning model comprises a double parallel feedforward neural network that takes a vector of mel-frequency cepstrum coefficients as an input, and wherein the trained machine learning model is trained by:
obtaining a training set comprising a plurality of training records, wherein:
each training record in the training set includes a plurality of parameters and corresponding values for a respective person;
each training record in the training set includes audio of the respective person's voice and an image of at least part of the respective person; and
each training record in the training set includes an indicator indicating whether or not the respective person has been diagnosed with a respiratory illness; and
training the machine learning model on the training set to infer whether users have the respiratory illness based on both the audio and images;
after obtaining the trained machine learning model, receiving, with the computer system, a first user record of a first user, the first user record comprising an audio file or stream of a voice of the first user and an image of at least part of the first user;
inferring, with the computer system, that the first user has the respiratory illness based on the audio file or stream of a voice of the first user and an image of at least part of the first user; and
storing, with the computer system, an indication that the first user has the respiratory illness in memory.

20. The medium of claim 1, wherein the double parallel feedforward neural network comprises two multi-layer feedforward neural networks.

21. The method of claim 19, wherein the double parallel feedforward neural network comprises two multi-layer feedforward neural networks.

22. The method of claim 19, wherein the plurality of training records comprises at least two of the following:
textual questionnaire answers;
data indicative of breathing;
temporal data;
facial image;
fingertip video; or
biometric images of skin, stool, mucus, urine, or vomit.

23. The method of claim 19, wherein the plurality of training records comprises each of the following:
textual questionnaire answers;
data indicative of breathing;
temporal data;
facial image;
fingertip video; and
biometric images of skin, stool, mucus, urine, or vomit.

24. The method of claim 19, wherein the plurality of training records comprises fingertip video, wherein the machine learning model is trained to use the fingertip video to measure blood oxygen level and heartbeat rate as features upon which inference is based.

25. The method of claim 19, further comprising:
steps for training the machine learning model.

26. The method of claim 19, wherein:
training the machine learning model comprises computing partial derivatives of parameters of the machine learning model with respect to an objective function and adjusting the parameters of the machine learning model in directions the partial derivatives indicate locally optimize the machine learning model.

27. The method of claim 19, wherein the machine learning model comprises:
at least two outputs, with a first output indicating COVID-19 infection and a second output indicating a stage of COVID-19 infection.

28. The method of claim 19, wherein:
the machine learning model comprises means for ensembling output of a plurality of sub-models.

29. The method of claim 19, further comprising:
configuring lossy compression of the audio file or stream of the person's voice to preserve non-human perceivable data that affects accuracy of the trained machine learning model.

30. The method of claim 19, wherein:
training the machine learning model is performed by a different set of computers of the computer system than a set of computers of the computer system that perform inferring the first user has the respiratory illness.

31. The method of claim 19, wherein:

inferring that the first user has the respiratory illness is performed by a smartphone of the first user that is part of the computer system.

32. The method of claim 19, wherein:

the trained machine learning model comprises an ensemble of at least three different machine learning algorithms having outputs combined with means for ensembling multiple sub-models.

33. The method of claim 19, further comprising:

performing a pre-processing of an audio voice sample, before inputting to the trained machine learning model, to clean the voice sample and select segments of the voice sample to be input to the trained machine learning model.

34. The method of claim 19, further comprising:

extracting cepstral coefficients from the audio file or stream of the voice of the first user.

35. The method of claim 34, wherein extracting the cepstral coefficients comprises:

constructing a spectrogram from the audio file or stream of the voice of the first user;

calculating a log-power for each frame from the spectrogram;

applying a filter to a magnitude of the log-power;

performing a log-compression and transform to a cepstral domain of an output of the filter; and forming a vector of cepstral coefficients for each frame.

36. The method of claim 19, further comprising:

extracting mel-frequency cepstral coefficients derived from a power spectrum of audio of a voice sample of a second user.

37. The method of claim 19, wherein the trained machine learning model comprises a multi-layer feedforward neural network comprising at least two non-linear layers.

38. The method of claim 19, further comprising:

steps for inferring likelihood of COVID-19 infection.

* * * * *